US012591090B2

(12) United States Patent
Qureshi et al.

(10) Patent No.: US 12,591,090 B2
(45) Date of Patent: Mar. 31, 2026

(54) HOLLOW-CORE PHOTONIC CRYSTAL FIBER BASED EDIBLE OIL SENSOR

(71) Applicant: KING FAHD UNIVERSITY OF PETROLEUM AND MINERALS, Dhahran (SA)

(72) Inventors: Khurram Karim Qureshi, Dhahran (SA); Eid M. Al-Mutairi, Dhahran (SA); Sheikh Sharif Iqbal, Dhahran (SA); Md. Ahasan Habib, Rajshahi (BD)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 294 days.

(21) Appl. No.: 18/473,689

(22) Filed: Sep. 25, 2023

(65) Prior Publication Data

US 2025/0102730 A1     Mar. 27, 2025

(51) Int. Cl.
*G01N 21/03*          (2006.01)
*G01N 21/3581*      (2014.01)
          (Continued)

(52) U.S. Cl.
CPC ......... *G02B 6/02328* (2013.01); *G01N 21/45* (2013.01); *G02B 6/02352* (2013.01);
          (Continued)

(58) Field of Classification Search
CPC ........... G01N 21/0303; G01N 21/3581; G01N 21/45; G01N 2021/458; G02B 6/02328; G02B 6/02352
See application file for complete search history.

(56) References Cited

U.S. PATENT DOCUMENTS 7,295,740 B2 *  11/2007  Sanghera .......... C03B 37/02781
                                                      385/125
7,343,074 B1 *  3/2008  Gallagher .......... G01N 21/3504
                                                      385/12

(Continued)

OTHER PUBLICATIONS

Islam et al ("Design of a Hollow-Core Photonic Crystal Fiber Based Edible Oil Sensor," Crystals 2022, 12(10), 1362). (Year: 2022).*

(Continued)

*Primary Examiner* — Ryan A Lepisto
(74) *Attorney, Agent, or Firm* — Oblon, McClelland, Maier & Neustadt, L.L.P.

(57)          ABSTRACT

A hollow-core photonic crystal fiber for sensing an oil includes a hexagonal core wall, a cladding region, and a circular layer. The hexagonal core wall defines a hollow space, where a core diameter is equal to a distance between two opposing inner vertices of the hexagonal core wall. The cladding region includes a circular cladding segment and up to four cladding arms, where the up to four cladding arms extend from the circular cladding segment to four outer vertices of the hexagonal core wall. An inner wall of the circular cladding segment, the up to four cladding arms and an outer surface of the hexagonal core wall define up to four wedge shaped air gaps. The cladding region has an inner radius with a range from 2.0 up to 2.4 times the core diameter and an outer radius with a range from 2.1 up to 2.6 times the core diameter.

16 Claims, 10 Drawing Sheets

(51) Int. Cl.
  *G01N 21/45* (2006.01)
  *G02B 6/02* (2006.01)
(52) U.S. Cl.
  CPC ..... *G01N 21/0303* (2013.01); *G01N 21/3581* (2013.01); *G01N 2021/458* (2013.01)

(56) References Cited

U.S. PATENT DOCUMENTS

| | | | | |
|---|---|---|---|---|
| 9,791,619 | B2 * | 10/2017 | Challener | G01N 21/0303 |
| 9,810,837 | B2 * | 11/2017 | Benabid | G02B 6/02347 |
| 10,816,721 | B1 * | 10/2020 | Chenard | G02B 6/02328 |
| 11,029,219 | B2 * | 6/2021 | Monro | G01K 11/3206 |
| 11,780,763 | B2 * | 10/2023 | Bauerschmidt | C03B 37/02736 |
| | | | | 29/428 |
| 12,181,708 | B2 * | 12/2024 | Unnimadhava Kurup Soudamini Amma | |
| | | | | G02B 6/032 |
| 2005/0008291 | A1 * | 1/2005 | Baney | G01N 21/31 |
| | | | | 356/300 |
| 2006/0104582 | A1 * | 5/2006 | Frampton | C03B 37/0122 |
| | | | | 385/125 |
| 2010/0247046 | A1 * | 9/2010 | Dong | B29D 11/00663 |
| | | | | 264/1.28 |
| 2012/0082410 | A1 * | 4/2012 | Peng | G02B 6/024 |
| | | | | 385/11 |
| 2017/0045682 | A1 * | 2/2017 | Hoppe | C03B 37/0256 |
| 2021/0348970 | A1 * | 11/2021 | Roussel | G02B 6/021 |
| 2022/0187532 | A1 | 6/2022 | Unnimadhava Kurup Soudamini Amma et al. | |

OTHER PUBLICATIONS

Sakawat Hossain, et al., "Designing of Hollow Core Grapefruit Fiber Using Cyclo Olefin Polymer for the Detection of Fuel Adulteration in Terahertz Region", Polymers, vol. 15, No. 151, Dec. 29, 2022, pp. 1-15.

Abdul Mu'iz Maidi, et al., "Characteristics of Ultrasensitive Hexagonal-Cored Photonic Crystal Fiber for Hazardous Chemical Sensing", Photonics, vol. 9, No. 38, Jan. 10, 2022, pp. 1-14.

Mohammad Rakibul Islam, et al., "Design of a hexagonal outlined porous cladding with vacant core photonic crystal fibre biosensor for cyanide detection at THz regime", IET Optoelectronics, vol. 16, Issue 4, Mar. 14, 2022, pp. 160-173.

* cited by examiner

Oil Sensing System
100

Hollow - Core Photonic
Crystal Fiber
101

Photonic
Crystal Fiber Sensor
102

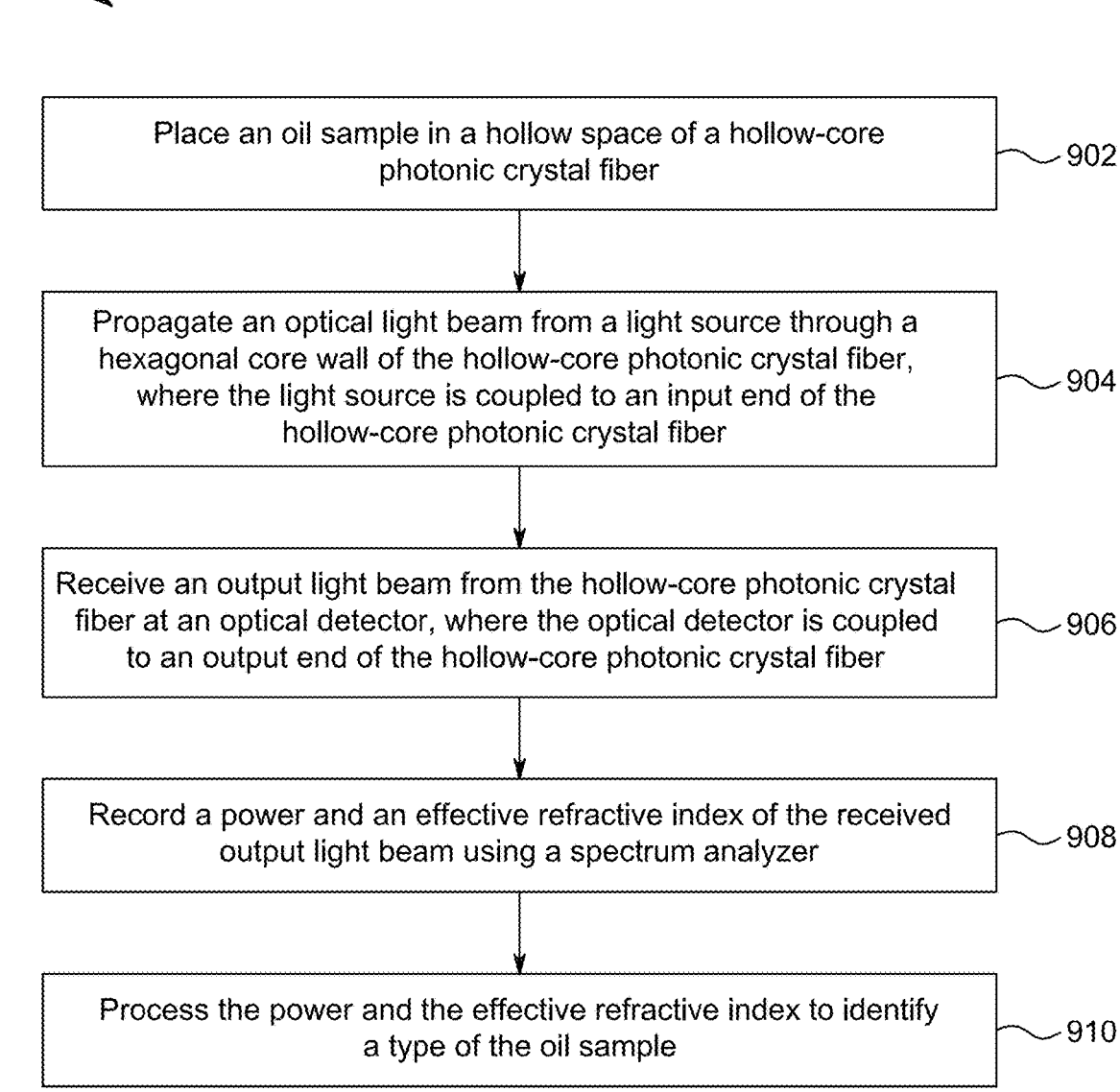

Place an oil sample in a hollow space of a hollow-core photonic crystal fiber ~902

Propagate an optical light beam from a light source through a hexagonal core wall of the hollow-core photonic crystal fiber, where the light source is coupled to an input end of the hollow-core photonic crystal fiber ~904

Receive an output light beam from the hollow-core photonic crystal fiber at an optical detector, where the optical detector is coupled to an output end of the hollow-core photonic crystal fiber ~906

Record a power and an effective refractive index of the received output light beam using a spectrum analyzer ~908

Process the power and the effective refractive index to identify a type of the oil sample ~910

FIG. 9

HOLLOW-CORE PHOTONIC CRYSTAL FIBER BASED EDIBLE OIL SENSOR

STATEMENT OF PRIOR DISCLOSURE BY AN INVENTOR(S)

Aspects of the present disclosure were described in Md. N. Islam, et al., "Design of a Hollow-Core Photonic Crystal Fiber Based Edible Oil Sensor," Crystals 2022, 12 (10), 1362, which is incorporated herein by reference in its entirety.

BACKGROUND

Technical Field

The present disclosure is directed to a photonic crystal fiber for sensing edible oil, and more particularly, a method and a system of a hollow-core photonic crystal fiber based edible oil sensor with a hexagonal shaped hollow-core operating in the terahertz (THz) range for sensing of different types of edible oils.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Edible oils, in general, are dietary fats that play a vital role in the human body by satiating nutritional demands, promoting development, ensuring healthy brain and nerve function, and maintaining the endocrine environment. Soybean oil, derived from soybean plant seeds, is one of the most widely used cooking oils globally. However, due to its high content of omega-6 fatty acids, excessive use of soybean oil may have adverse health consequences. Unfortunately, some unethical companies offer contaminated oil, posing significant health risks to the public. As a result, physicians increasingly recommend and encourage cardiac patients and the general public to use other vegetable and seed oils for cooking. Oils such as sunflower oil, mustard oil, olive oil, and coconut oil, which are regularly used for cooking, have fewer adverse health effects compared to soybean oil. However, because the colors of these cooking oils are almost identical, consumers often find it challenging to distinguish between them. Furthermore, low-cost cooking oils, such as palm oil, are sometimes disguised as high-cost oils like mustard oil and sunflower oil by adding color or toxic chemical compounds. Accordingly, it is critical to detect pure edible oil for reducing health risks and maintaining a healthy lifestyle.

Photonic crystal fiber sensors have created new possibilities for enhancing photonic instruments in sensing and telecom applications. The photonic crystal fiber allows for a wide range of optical qualities to be realized in its design, including infinite single-mode operation, a larger effective core area, higher transparency, design flexibility, and low loss. These distinguishing characteristics have led to the development of cutting-edge technologies to address conventional issues such as telecommunications launch and dissemination. Similarly, the photonic crystal fiber was also developed to establish a new generation of active and passive optical devices for the telecommunications industry.

On the contrary, due to their high sensitivity and small size, photonic crystal fiber-based sensor devices have found applications in various real-world applications, including chemical sensing, biological tissue diagnosis, and cancer cell detection, among others.

Due to numerous potential applications of photonic crystal fibers, a small region in the electromagnetic spectrum (0.1 to 10 THz) has recently gained widespread attention and is termed the terahertz (THz) radiation band. This radiation band, situated between the infrared and microwave regions, is often employed without any negative effects on humans or the environment. Since air lacks absorbent qualities within this spectral range, it was initially used as a medium for transmitting THz signals. However, significant issues such as dispersion, isolation, and transmitter-receiver alignment, arise when transmitting THz signals over long distances. Several waveguides, such as parallel plate waveguides, metal waveguides, hollow-core waveguides, and photonic crystal fibers, have been proposed to facilitate effective signal transmission across this spectral range. THz photonic crystal fiber waveguides offer higher transmission quality in comparison to other waveguides because they absorb less energy.

Consequently, photonic crystal fibers have become a crucial component in THz signal transmission, and photonic crystal fiber waveguides are typically employed as sensors in various applications.

Recently, numerous alternative supported waveguides have been proposed and examined to determine their suitability for sensing fluids within the THz range. For example, a sensor device that supports a perforated core photonic crystal fiber is used to sense liquids in the THz frequency band, a hollow-core photonic crystal fiber with rectangular air holes is utilized for detecting various liquids in the THz frequency band, a hollow-core PCF is used for detecting blood components. In contrast, a substantial number of one-dimensional photonic crystal fiber-based sensors have been proposed for detecting liquid samples by using the surface plasmon resonance (SPR) technique. In this method, a layer of solid metal or composite material serves as a detection layer, and for a particular refractive indexed sample, a sharp loss peak is observed at a specific wavelength. However, fabrication of one-dimensional photonic crystal fiber-based sensors is more complex compared to that of three-dimensional photonic crystal fiber-based sensors.

Accordingly, it is one object of the embodiments herein to provide a photonic crystal fiber-based sensor for edible oils that is realizable using conventional manufacturing processes and has superior sensing capabilities when compared to existing techniques. The embodiments herein are directed towards a hybrid structured hexagonal hollow-core photonic crystal fiber-based oil detector in the terahertz (THz) domain for the detection of various oils such as sunflower oil, mustard oil, olive oil, palm oil, and coconut oil.

SUMMARY

In an embodiment, a hollow-core photonic crystal fiber for sensing an oil is described. The hollow-core photonic crystal fiber for sensing the oil includes a hexagonal core wall defining a hollow space, a cladding region, and a circular layer surrounding the cladding region. A core diameter of the hexagonal core wall defining the hollow space is equal to a distance between two opposing inner vertices of the hexagonal core wall. The cladding region includes a circular cladding segment and up to four cladding arms. Up to four cladding arms extend from the circular cladding segment to four outer vertices of the hexagonal core wall. An inner wall of the circular cladding segment, the up to four cladding arms and an outer surface of the hexagonal core wall define up to four wedge shaped air gaps. The cladding region has an inner radius with a range from 2.0 up to 2.4 times the core diameter and an outer radius with a range from 2.1 up to 2.6 times the core diameter.

In another embodiment, an oil sensing system is described. The oil sensing system includes a hollow-core photonic crystal fiber and a photonic crystal fiber sensor coupled to the hollow-core photonic crystal fiber. The hollow-core photonic crystal fiber for sensing the oil includes a hexagonal core wall defining a hollow space, a cladding region, and a circular layer surrounding the cladding region. A core diameter of the hexagonal core wall defining the hollow space is equal to a distance between two opposing inner vertices of the hexagonal core wall. The cladding region includes a circular cladding segment and up to four cladding arms. Up to four cladding arms extend from the circular cladding segment to four outer vertices of the hexagonal core wall. An inner wall of the circular cladding segment, the up to four cladding arms and an outer surface of the hexagonal core wall define up to four wedge shaped air gaps. The cladding region has an inner radius with a range from 2.0 up to 2.4 times the core diameter and an outer radius with a range from 2.1 up to 2.6 times the core diameter.

In yet another embodiment, a method of sensing an oil using the hollow-core photonic crystal fiber is described. An oil sample is placed in a hollow space of the hollow-core photonic crystal fiber. An optical light beam is propagated from a light source through a hexagonal core wall of the hollow-core photonic crystal fiber. The light source is coupled to an input end of the hollow-core photonic crystal fiber. An output light beam is received from the hollow-core photonic crystal fiber at an optical detector. The optical detector is coupled to an output end of the hollow-core photonic crystal fiber. A power and an effective refractive index of the received output light beam is recorded using a spectrum analyzer. The power and the effective refractive index are processed to identify a type of the oil sample.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

Figure 1A:
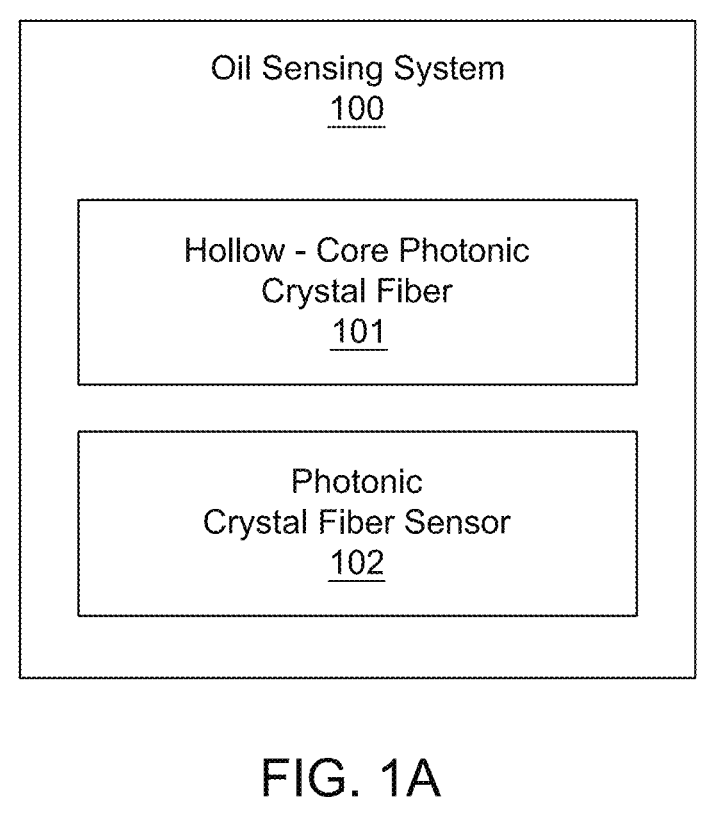

FIG. 1A illustrates a block diagram of an oil sensing system, according to aspects of the present disclosure;

FIG. 9 depicts a flowchart of a method for sensing an oil using the hollow-core photonic crystal fiber, according to aspects of the present disclosure.

DETAILED DESCRIPTION

Figure 1B:
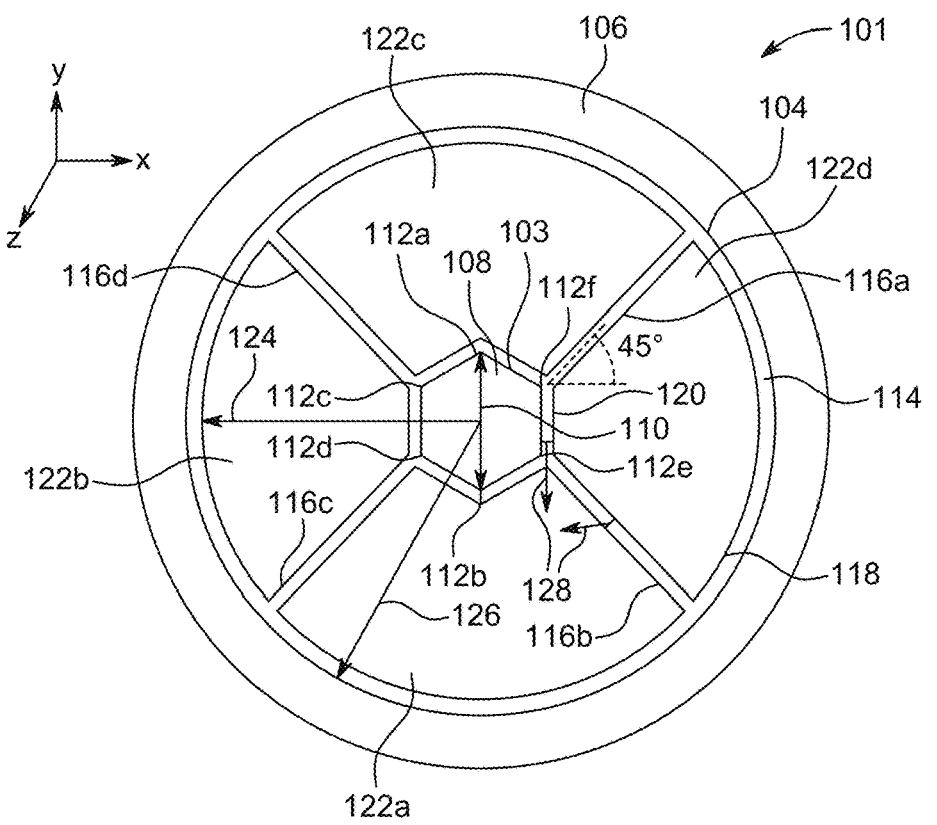
FIG. 1B illustrates a cross sectional view of a hollow-core photonic crystal fiber for sensing an oil, according to aspects of the present disclosure.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The embodiments herein are directed to a hollow-core photonic crystal fiber for sensing edible oils. Generally, oil sensors are used for sensing oil quality, i.e., oil sensors measure quality of an oil by monitoring quality indicators such as and refractive index oil dielectric constant, which is further based on the moisture content, wear particles, and/or acid value of an oil sample. The sensing capability of an oil sensor is based on the efficiency of detecting the quality indicators. The hollow-core photonic crystal fiber disclosed herein, exhibits superior sensing capabilities through low confinement loss, high numerical aperture, effective area at optimal geometry and operational conditions as part of oil detection systems.

FIG. 1A illustrates a block diagram of an oil sensing system 100, according to embodiments herein. The oil sensing system 100 includes a hollow-core photonic crystal fiber 101 and a photonic crystal fiber sensor 102 coupled to the hollow-core photonic crystal fiber 101. The photonic crystal fiber sensor 102 is configured to analyze a refractive index of an oil sample. For ease of explanation and understanding, it may be assumed that the photonic crystal fiber sensor 102 is a component of the hollow-core photonic crystal fiber 101.

FIG. 1B illustrates a cross sectional view of the hollow-core photonic crystal fiber 101. In an aspect of the embodiments herein, the hollow-core photonic crystal fiber 101 is implemented as a sensor for sensing edible oils. The hollow-core photonic crystal fiber 101 includes a hexagonal shaped core wall 103, a cladding region 104, and a circular layer 106 surrounding the cladding region 104. In examples, a material utilized for the cladding region 104 is a cyclic olefin polymer. Cyclic olefin (co) polymers contain one or more polymerized cyclic monomers such as 8,9,10-trinorborn-2-ene (norbornene) or 1,2,3,4,4a,5,8,8a-octahydro-1,4:5,8-di-methanonaphthalene (tetracyclododecene) optionally with an olefin comonomer such as ethene and propene. In examples, a material utilized for the circular layer 106 is a perfectly matched layer. Perfectly matched layers are absorbing layers that will attenuate any wave passing through them. Typically, materials such as wood, graphite, carbon fiber, and crystals with a thickness between 4 and 8 cells are used as perfectly matched layer. The thickness can be optionally changed if required. A preferred property of the perfectly matched layer of the present disclosure is its ability to absorb incident light reflected upon the perfectly matched layer without further reflection at the perfectly matched layer interface. A perfectly matched layer strongly absorbs outgoing light and electromagnetic waves from the interior of the fiber without reflecting them back into the interior.

In FIG. 1B the hollow-core photonic crystal fiber (PCF) 101 has a hexagonal shaped cavity 108 in the middle of the PCF fiber running lengthwise and co-axially with the fiber. This hexagonal shaped cavity 108 can also be defined as a hollow-space 108. The hollow space 108 obtains its hexagonal shape from the hexagonal shaped core wall 103. The hexagonal shaped core wall 103 has a core diameter (represented by reference numeral "110" in FIG. 1B) defined as an internal distance between any two opposing vertices of the six vertices such as, the internal distance between vertices 112a and 112b, or vertices 112c and 112e, or vertices 112d and 112f of the hexagonal core wall 103. The hollow space 108 of the hexagonal core wall 103 is preferably filled with an oil sample. In examples, the hexagonal core wall 103 is configured to carry, e.g., axially transmit along the length of the fiber, an optical light for sensing oil. In an aspect, the hollow-core photonic crystal fiber 101 is configured to be connected to a light source with a wavelength in terahertz, such as, a wavelength in a range from 0.1 up to 10 terahertz (THz), preferably 0.1 to 2 THz. The hollow space 108 of the hexagonal core wall 103 may be filled with additional oil samples thereby increasing the sensing capabilities of the hollow-core photonic crystal fiber 101. In the embodiments herein, the hexagonal core wall 103 has a width 128 of a range from 0.12 up to 0.15 times the core diameter 110. (128 in FIG. 1B).

In embodiments herein, the cladding region 104 surrounds the hexagonal core wall 103. The cladding region 104 includes a circular cladding segment 114 and cladding arms 116a-d. In an aspect, the cladding region 104 incudes up to four cladding arms 116a-d. The four cladding arms 116a-d extend from an inner surface of the circular cladding segment 114 to outer points of four vertices of the hexagonal core wall, such as 112c, 112d, 112e, and 112f of the hexagonal core wall 103. The four vertices include two pairs of adjacent vertices of the hexagonal core wall 103. In the embodiments herein, the four vertices to which the four cladding arms 116a-d are connected are adjacent vertices pair 112c-112d, and adjacent vertices pair 112e-112f of the hexagonal core wall 103. An inner wall 118 of the circular cladding segment 114, the up to four cladding arms 116a-d, and an outer surface 120 of the hexagonal core wall 103 define up to four wedge shaped gaps or cavities 122a-d. In an aspect, two gaps, 122a and 122c, of the up to four wedge shaped gaps 122a-d are pentagonal wedge-shaped gaps, and two gaps, 122b and 122d, of the up to four wedge shaped gaps 122a-d are quadrilateral wedge-shaped air gaps. The wedge-shaped gaps preferably have a single curved or arced side. In an example implementation, the circular cladding segment 114 is made of Zeonex® or more commonly cyclic olefin polymer (e.g., a polymer with an alicyclic structure having a 4, 5, 6, 7 or 8 membered aliphatic ring), as it has a low loss and a consistent index of refraction (n=1.53) in the range of 0.1 to 2 THz. In the THz frequency spectrum, cyclic olefin polymer has high refractive index and transparency as compared to optical polymer known to those skilled in the art.

The cladding region 104 has an inner radius (represented by reference numeral "124" in FIG. 1B) that extends from the center of the hollow space 108 to the inner surface of the circular cladding segment 114. In the embodiment herein, the inner radius 124 is from 2.0 up to 2.4 times the core diameter. The cladding region 104 also has an outer radius (represented by reference numeral "126" in FIG. 1B) that extends from the center of the hollow space 108 to the outer surface of the circular cladding segment 114. In the embodiments herein, the outer radius 126 is from 2.1 up to 2.6 times the core diameter. In examples, the inner radius may be 2.2 times the core diameter and the outer radius may be 2.3 times the core diameter.

In the embodiments herein, each of the cladding arms 116a, 116b, 116c, 116d has a width 128 of a range from 0.12 up to 0.15 times the core diameter 110. In the embodiments herein, for consistency, all geometric parameters such as, the inner radius and the outer radius of the cladding region 104 and the width of the hexagonal core wall 103, or the distance between the hexagonal core wall 103 and the closest cladding arm as well as the consecutive wedge-shaped air gaps, are described relative to the core diameter so as to eliminate fabrication complexity.

In the embodiments herein, the circular layer 106 surrounds the cladding region 104. In an aspect, the circular layer 106 is configured to absorb light exiting the cladding region at the outer surface of the cladding region 104. The circular cladding segment 114 of the cladding region 104 is preferably directly and continuously adjacent to the circular layer 106. The circular layer 106 functions to reduce or eliminate back-reflection by absorbing light that seeps from the hexagonal core wall 103 at the outer surface of the cladding region 104.

Examples

The following examples describe and demonstrate exemplary embodiments. The examples are provided solely for the purpose of illustration and are not to be construed as limitations of the present disclosure, as many variations thereof are possible without departing from the spirit and scope of the present disclosure.

In the embodiments herein, an electric field distribution of the hollow-core photonic crystal fiber 101 was examined using a finite element method (FEM). In examples, the hollow-core photonic crystal fiber 101 was assessed by means of Comsol Multiphysics, which is a finite element method-based commercial tool. The hollow space 108 of the hexagonal core wall 103 of the hollow-core photonic crystal fiber 101 was filled with a sample under test. Table 1 depicts the refractive index information of different oil samples at room temperature.

TABLE 1

Refractive indices of different oil samples
under test at room temperature

| Oil Type | Refractive Index |
| --- | --- |
| Sunflower oil | 1.472 |
| Mustard oil | 1.470 |
| Olive oil | 1.466 |
| Coconut oil | 1.463 |
| Palm oil | 1.454 |

In an example implementation, the sensor of an oil sensing system is the hollow-core photonic-crystal fiber 101, as described above. The oil sensing system also includes a terahertz (THz) light source, an optical detector, a spectrum analyzer, a processor with circuitry for processing light transmittance and refraction, and a display unit for examining the electric field distribution. An isotonic solution of the testing sample and a laser light source with a narrow bandwidth, typically between 0.1 to 2 THz, is preferred to attain maximum accuracy. In the example implementation, the sample was placed inside the hollow space 108 of the hexagonal core wall 103 of the hollow-core photonic crystal fiber 101. The sample was placed in the hollow space 108 before the THz light source was turned on. The photodetector received the light beam after the light beam propagated through the hollow-core photonic crystal fiber 101. The spectrum analyzer analyzed the amount of power and an effective refractive index of the received light. A computer was used to compute a relative sensitivity and one or more other guiding parameters of the hollow-core photonic crystal fiber 101.

Figure 2A:
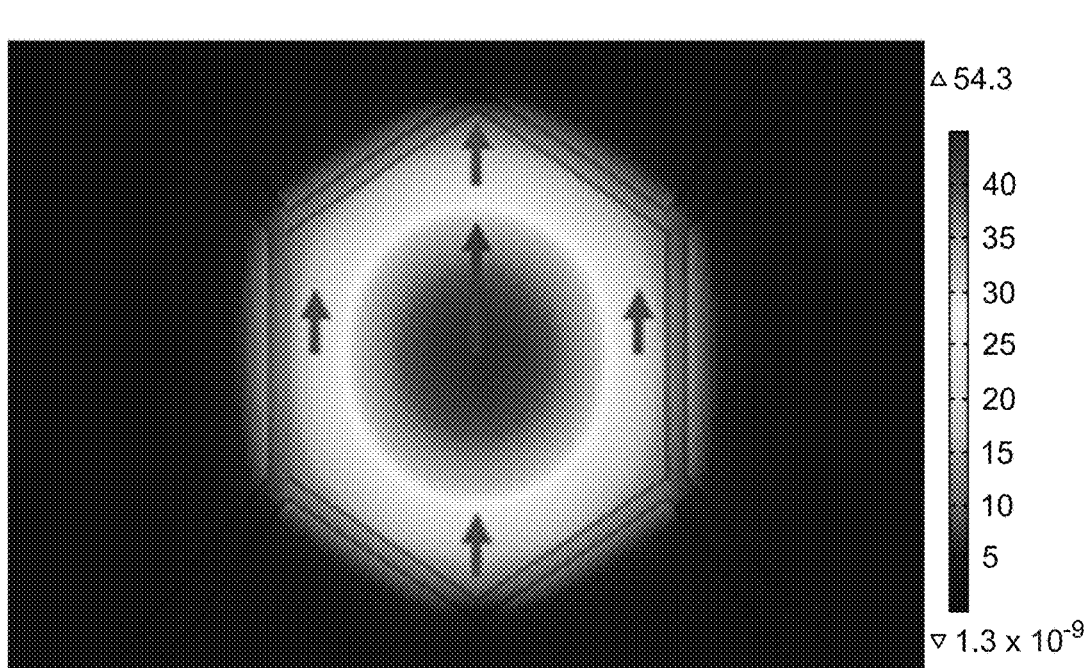
FIG. 2A depicts an electric field distribution of the hollow-core photonic crystal fiber for sunflower oil, according to aspects of the present disclosure.
Figure 2B:
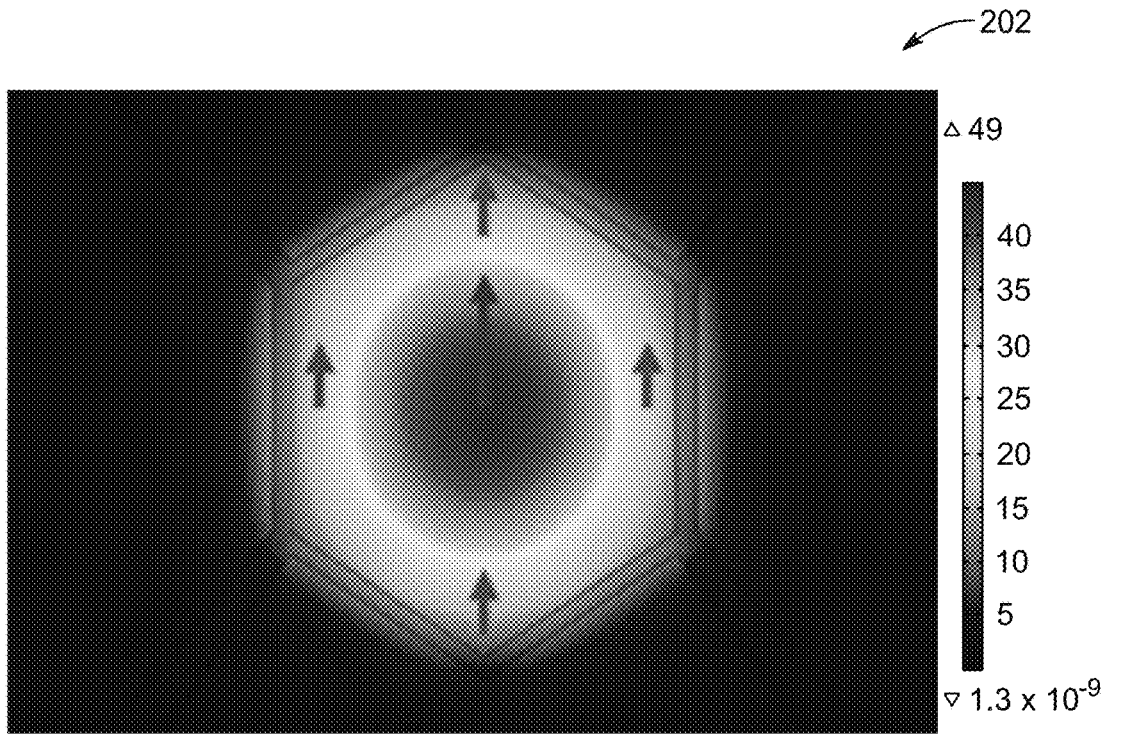
FIG. 2B depicts an electric field distribution of the hollow-core photonic crystal fiber for mustard oil, according to aspects of the present disclosure.
Figure 2C:
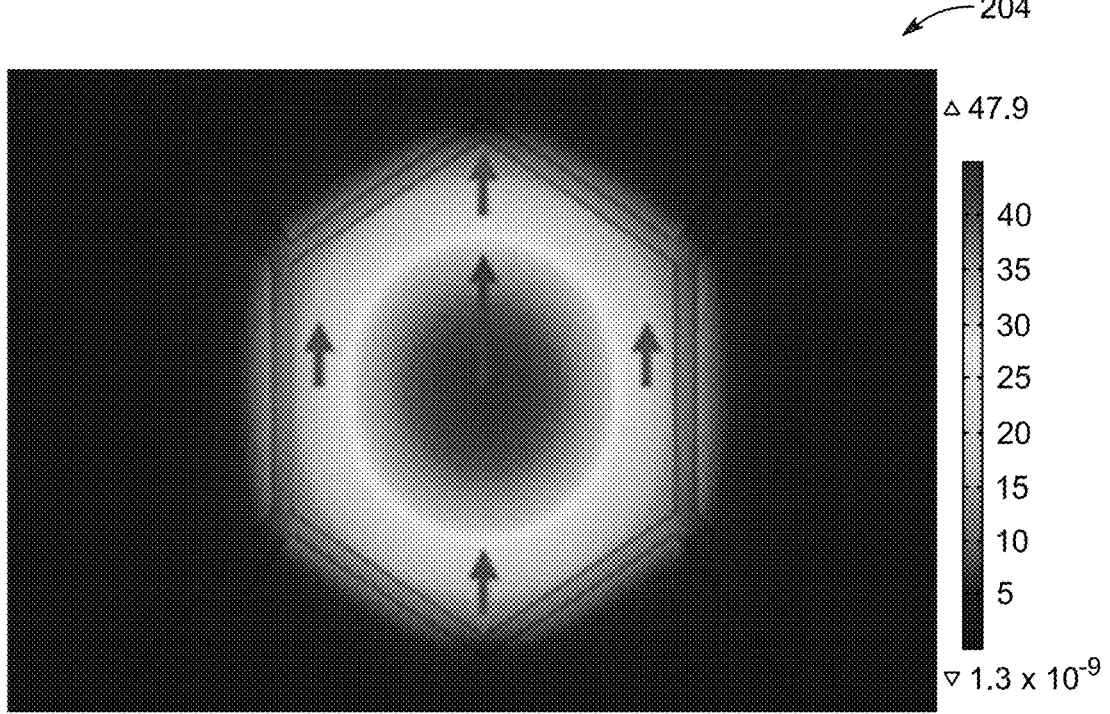
FIG. 2C depicts an electric field distribution of the hollow-core photonic crystal fiber for olive oil, according to aspects of the present disclosure.

FIG. 2A-FIG. 2C depict an electrical field distribution of the hollow-core photonic crystal fiber 101 for various oils, such as, sunflower oil, mustard oil, and olive oil. In particular, FIG. 2A depicts an electric field distribution 200 of the hollow-core photonic crystal fiber 101 for sunflower oil, according to aspects of the present disclosure. FIG. 2B depicts an electric field distribution 202 of the hollow-core photonic crystal fiber 101 for mustard oil, according to aspects of the present disclosure. FIG. 2C depicts an electric field distribution 204 of the hollow-core photonic crystal fiber 101 for olive oil, according to aspects of the present disclosure. As can be observed from FIGS. 2A-2C, the light is highly restricted within the hollow-core photonic crystal fiber 101, which is preferred for high sensitivity.

The Beer-Lambert law describes that the strength of radiation-matter interaction determines the sensitivity of an oil adulteration sensor. In an aspect, the working principle of the Beer-Lambert law is used for the hollow-core photonic crystal fiber 101, where the measurements rely on the changes in the absorption coefficient at a specific frequency, as shown in Equation (1).

$$I(f) = I_0(f)e^{-r\alpha_m l_c} \tag{1}$$

where I(f) represent the intensity of the radiation when the hollow-core photonic crystal fiber 101 is filled with the sample under test, $I_0(f)$ represents the intensity without the presence of the sample under test, r represents the relative sensitivity of the hollow-core photonic crystal fiber 101, am represents the absorption coefficient, and $l_c$ represents the length of the hollow-core photonic crystal fiber 101. The relative sensitivity of the hollow-core photonic crystal fiber 101 represents the ability of the hollow-core photonic crystal fiber 101 to detect changes in the sample under test. The relative sensitivity of the hollow-core photonic crystal fiber 101 may be calculated using Equation (2) provided below:

$$r = \frac{n_r}{n_{eff}} X \tag{2}$$

where $n_r$ represents the real part of the refractive index of the analyte targeted to be sensed and $n_{eff}$ represents the effective refractive index of the guided mode. The guided mode's effective refractive index may be sensitive to changes in the sample under test characteristics. The amount of light signal that interacts with the testing analyte is expressed as X (power fraction). The power fraction may be calculated using Equation (3) provided below.

$$X = \frac{\int_{sample} R_e(E_X H_y - E_y H_x)}{\int_{total} R_e(E_x H_y - E_y H_x)} \times 100 \tag{3}$$

where E represents the electric field of the propagating signal and H represents and the magnetic field of the propagating signal. The subscripts x and y designate the polarization in the x-axis and y-axis.

In Equation (3), the denominator performs the combination of the real part (Re) of the whole power over the whole dimensions of the hollow-core photonic crystal fiber 101, and the numerator performs a similar operation for only the portion of the hollow-core photonic crystal fiber 101, where the sample is located, within the hollow space 108 of the hexagonal core wall 103 of the hollow-core photonic crystal fiber 101. The performance of the hollow-core photonic crystal fiber 101 was analyzed as a function of the geometry of the structure as well as the frequency. Initially, the relative sensitivity of the hollow-core photonic crystal fiber 101 was observed as a function of the core diameter of the hexagonal core wall 103, which was tuned from 270 μm to 370 μm. In the example implementation herein, the examination was carried out at an operating frequency of 1.6 THz.

Figure 3A:
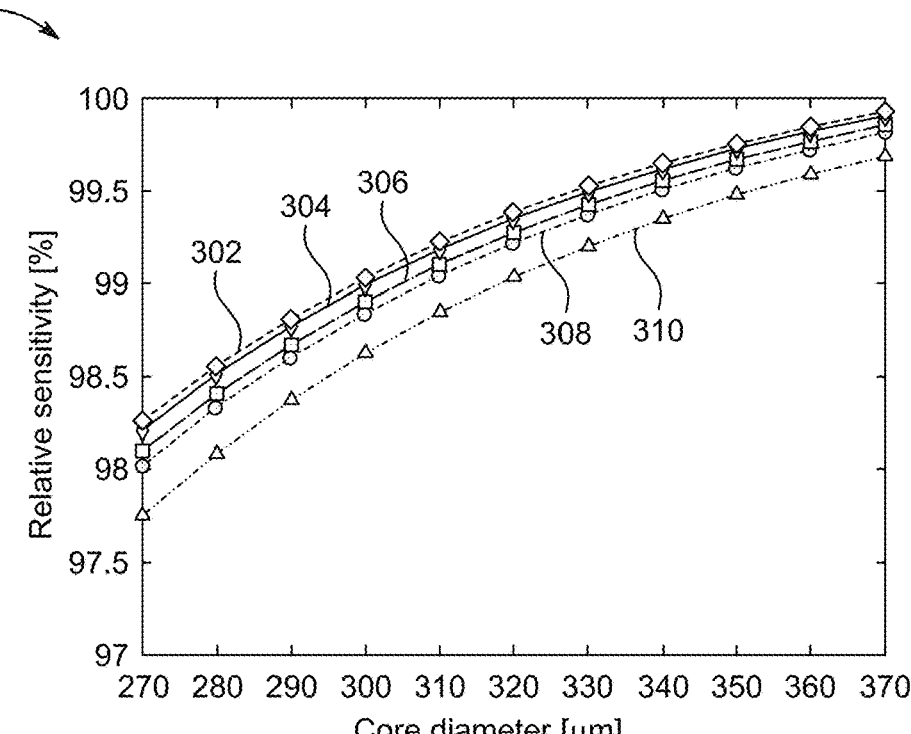
FIG. 3A shows a plot illustrating relative sensitivity variations of the hollow-core photonic crystal fiber for different core diameters at 1.6 THz for different types of oil, according to aspects of the present disclosure.
Figure 3B:
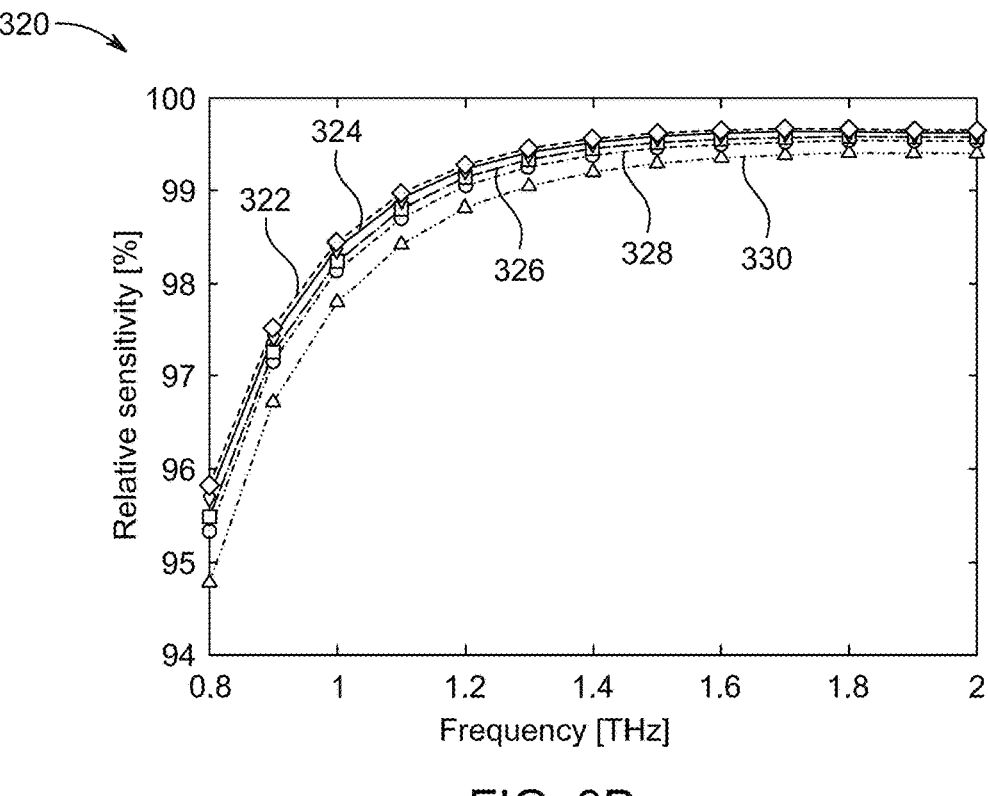
FIG. 3B shows a plot illustrating relative sensitivity variations of the hollow-core photonic crystal fiber for different operating frequencies at 340 μm core diameter for different types of oil, according to aspects of the present disclosure.

FIG. 3A and FIG. 3B depict relative sensitivity variations of the hollow-core photonic crystal fiber 101 for different core diameters and different operating frequencies for sunflower oil, mustard oil, olive oil, palm oil, and coconut oil. In particular, FIG. 3A shows a plot 300 illustrating relative sensitivity variations of the hollow-core photonic crystal fiber 101 for different core diameters at 1.6 THz for sunflower oil, mustard oil, olive oil, palm oil, and coconut oil, according to aspects of the present disclosure. In FIG. 3A, plot line 302 represents relative sensitivity variations of the hollow-core photonic crystal fiber 101 for different core diameters at 1.6 THz for sunflower oil. Plot line 304 represents relative sensitivity variations of the hollow-core photonic crystal fiber 101 for different core diameters at 1.6 THz for mustard oil. Plot line 306 represents relative sensitivity variations of the hollow-core photonic crystal fiber 101 for different core diameters at 1.6 THz for olive oil. Plot line 308 represents relative sensitivity variations of the hollow-core photonic crystal fiber 101 for different core diameters at 1.6 THz for palm oil. Plot line 310 represents relative sensitivity variations of the hollow-core photonic crystal fiber 101 for different core diameters at 1.6 THz for coconut oil.

As can be observed from FIG. 3A, the relative sensitivity rises slowly as the core diameter of the hexagonal core wall 103 increases. In an aspect, as the core diameter increases, the amount of detected analyte inside the hollow space 108 of the hexagonal core wall 103 also increases. As a result, more radiations interact with the analyte, increasing the relative sensitivity of the hollow-core photonic crystal fiber 10. The total dimensions of the hollow-core photonic crystal fiber 101 are governed by the core size and the larger and bulkier structure. As a result, parametric value and the fiber dimensions are considered with 340 μm as the optimal core diameter. The relative sensitivity is higher, and the confinement loss is satisfactory for the core diameter. At optimal conditions, the relative sensitivities of the hollow-core photonic crystal fiber 101 for sunflower oil, mustard oil, olive oil, palm oil, and coconut oil are 99.65%, 99.60%, 99.55%, 99.50%, and 99.35%, respectively, as shown in FIG. 3A. This is due to refractive index of sunflower oil being the highest and that of coconut oil being the lowest. In addition, sunflower oil has the highest relative sensitivity and coconut oil has the lowest relative sensitivity.

FIG. 3B shows a plot 320 illustrating relative sensitivity variations of the hollow-core photonic crystal fiber 101 for different operating frequencies at 340 μm core diameter for sunflower oil, mustard oil, olive oil, palm oil, and coconut oil, according to aspects of the present disclosure. In FIG. 3B, plot line 322 represents relative sensitivity variations of the hollow-core photonic crystal fiber 101 for different operating frequencies at 340 μm core diameter for sunflower oil. Plot line 324 represents relative sensitivity variations of the hollow-core photonic crystal fiber 101 for different operating frequencies at 340 μm core diameter for mustard oil. Plot line 326 represents relative sensitivity variations of the hollow-core photonic crystal fiber 101 for different operating frequencies at 340 μm core diameter for olive oil. Plot line 328 represents relative sensitivity variations of the hollow-core photonic crystal fiber 101 for different operating frequencies at 340 μm core diameter for palm oil. Plot line 330 represents relative sensitivity variations of the hollow-core photonic crystal fiber 101 for different operating frequencies at 340 μm core diameter for coconut oil.

As shown in FIG. 3B, the relative sensitivity grows rapidly from 0.8 to 1.3 THz, then slowly beyond that and, after 1.6 THz, the relative sensitivity for all oil types is nearly constant. A higher frequency electromagnetic wave tends to traverse a higher indexed zone, hence more light propagates through the high indexed sample, thereby increasing the sensitivity. Accordingly, the hollow-core photonic crystal fiber 101 has a relative sensitivity of over 99% for all oil samples at 1.6 THz under ideal geometric conditions, which is higher than any other reported results in the conventional studies.

The loss profile of the hollow-core photonic crystal fiber 101 was examined for different conditions. The effective material loss (EML) and confinement loss (CL) are the two main types of losses that occur in the hollow-core photonic crystal fiber 101. The EML occurs due to the presence of solid material in the hollow-core photonic crystal fiber 101, while CL arises due to the power absorption of the wedge-shaped air gaps 122*a-d* around the hexagonal core wall 103. The EML and CL of the hollow-core photonic crystal fiber 101 may be calculated based on Equations (4) and (5) provided below.

$$\alpha_{eff} = \frac{\left(\frac{\varepsilon_0}{\mu_0}\right)^{\frac{1}{2}} \int_{A_{mat}} n\alpha_{mat}|E|^2 d\,A}{2\int_{All} S_z dA} \tag{4}$$

$$\alpha_{CL} = 8.686 \times \frac{2\pi f}{c} \text{Im}\,(n_{eff}) \tag{5}$$

where the frequency of the operational EM signal is denoted by f, the velocity of light in a vacuum is denoted by c, the loss coefficient of the substance material is indicated by $\alpha_{mat}$, the electric field is identified by E, and Im $(n_{eff})$ denotes the imaginary component of the effective refractive index of the travelling wave.

Figure 4A:
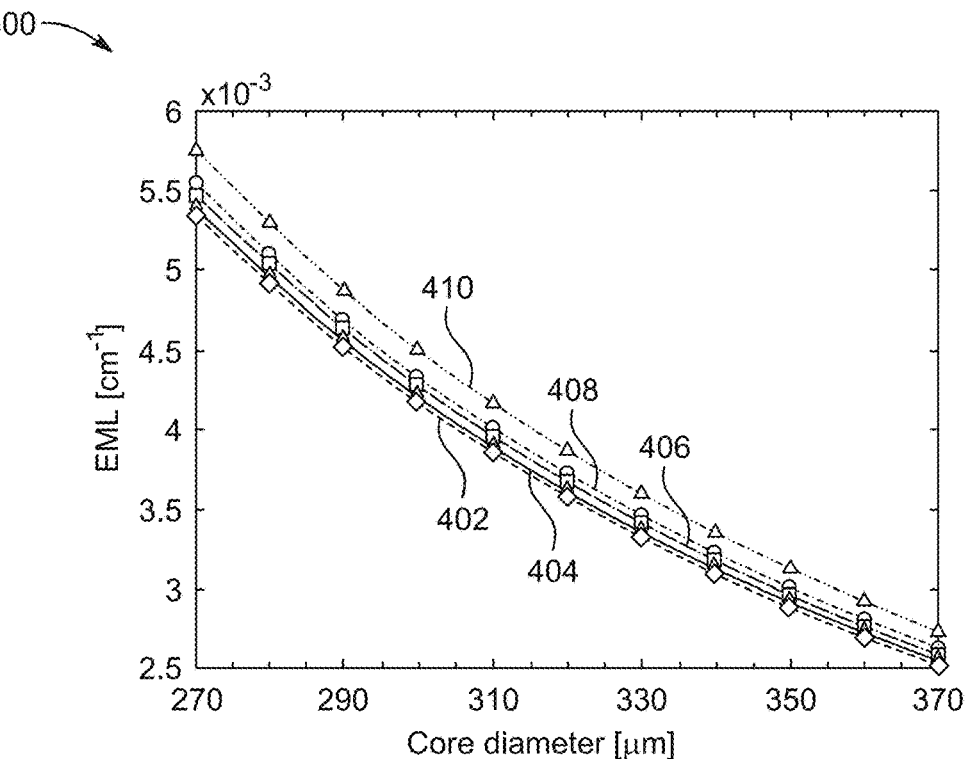
FIG. 4A shows a plot illustrating effective material loss (EML) characteristics of the hollow-core photonic crystal fiber for different core diameters at an operating frequency of 1.6 THz for different types of oil, according to aspects of the present disclosure.
Figure 4B:
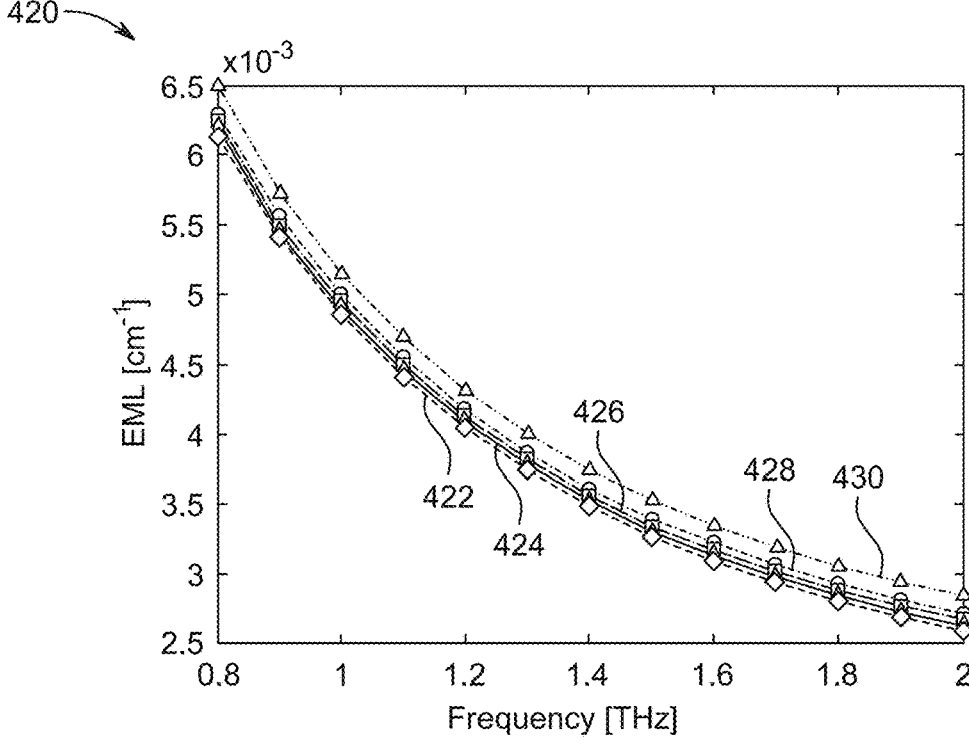
FIG. 4B shows a plot illustrating EML characteristics of the hollow-core photonic crystal fiber for different values of frequencies at 340 μm core diameter for different types of oil, according to aspects of the present disclosure.

FIG. 4A and FIG. 4B depict EML characteristics of the hollow-core photonic crystal fiber 101 for different core diameters at an operating frequency of 1.6 THz and different values of frequencies at 340 μm for sunflower oil, mustard oil, olive oil, palm oil, and coconut oil. In particular, FIG. 4A shows a plot 400 illustrating EML characteristics of the hollow-core photonic crystal fiber 101 for different core diameters at an operating frequency of 1.6 THz for sunflower oil, mustard oil, olive oil, palm oil, and coconut oil, according to aspects of the present disclosure. In FIG. 4A, plot line 402 represents EML characteristics of the hollow-core photonic crystal fiber 101 for different core diameters at an operating frequency of 1.6 THz for sunflower oil. Plot line 404 represents EML characteristics of the hollow-core photonic crystal fiber 101 for different core diameters at an operating frequency of 1.6 THz for mustard oil. Plot line 406 represents EML characteristics of the hollow-core photonic crystal fiber 101 for different core diameters at an operating frequency of 1.6 THz for olive oil. Plot line 408 represents EML characteristics of the hollow-core photonic crystal fiber 101 for different core diameters at an operating frequency of 1.6 THz for palm oil. Plot line 410 represents EML characteristics of the hollow-core photonic crystal fiber 101 for different core diameters at an operating frequency of 1.6 THz for coconut oil.

FIG. 4B shows a plot 420 illustrating EML characteristics of the hollow-core photonic crystal fiber 101 for different values of frequencies at 340 μm core diameter for sunflower oil, mustard oil, olive oil, palm oil, and coconut oil, according to aspects of the present disclosure. In FIG. 4B, plot line 422 represents EML characteristics of the hollow-core photonic crystal fiber 101 for different values of frequencies at 340 μm core diameter for sunflower oil. Plot line 424 represents EML characteristics of the hollow-core photonic crystal fiber 101 for different values of frequencies at 340

µm core diameter for mustard oil. Plot line 426 represents EML characteristics of the hollow-core photonic crystal fiber 101 for different values of frequencies at 340 µm core diameter for olive oil. Plot line 428 represents EML characteristics of the hollow-core photonic crystal fiber 101 for different values of frequencies at 340 µm core diameter for palm oil. Plot line 430 represents EML characteristics of the hollow-core photonic crystal fiber 101 for different values of frequencies at 340 µm core diameter for coconut oil.

FIGS. 4A and 4B indicate that EML reduces with an increasing core diameter at 1.6 THz as the expanded core allows less resistivity to propagate through the core. As a result, a limited amount of light is captured by the solid substance, and the loss is reduced. The EML for different oil samples at optimal core diameter varies approximately from 0.032 cm$^{-1}$ to 0.034 cm$^{-1}$, which is quite small. Notably, oil with a higher refractive index has a lower EML since it allows more light to pass through it at a constant operating condition than oil with a lower refractive index. Similar types of characteristics are shown by the hollow-core photonic crystal fiber 101 for different operating frequencies in FIG. 4B. At higher frequencies, reduced light travels through the low-indexed cladding region, and therefore a lesser amount of light is trapped by the solid material between the hexagonal core wall 103 and the cladding region 104. This is the reason the loss is lower for higher frequencies. At the 1.6 THz range and 340 µm core diameter, the EML of the hollow-core photonic crystal fiber 101 is less than 0.0034 cm$^{-1}$ which is lower than conventional sensors.

Figure 5A:
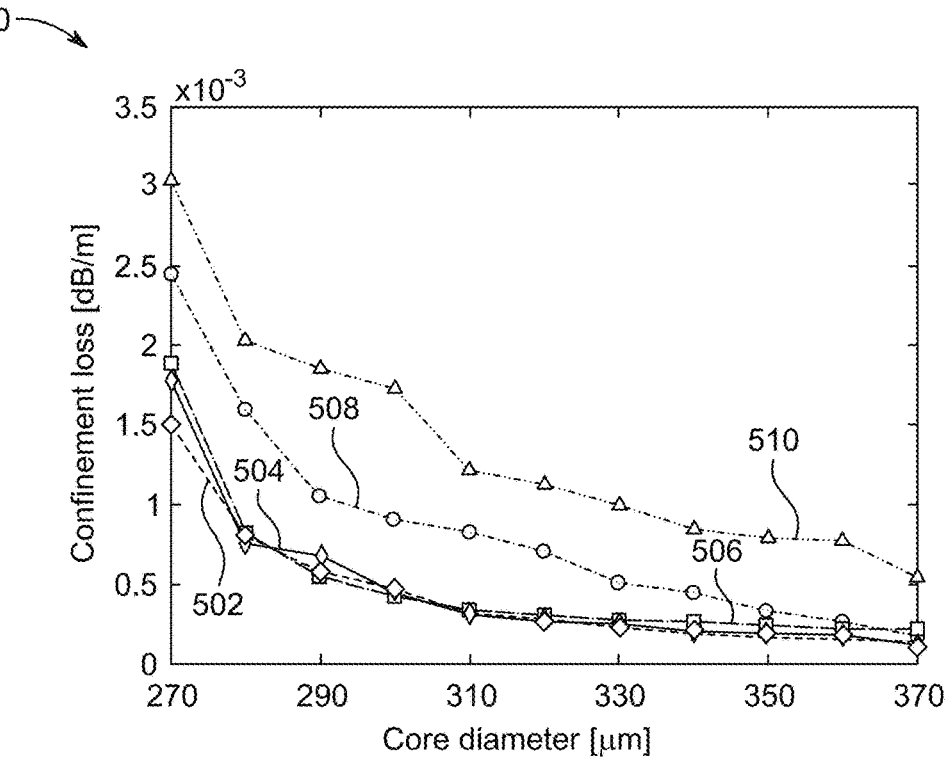
FIG. 5A shows a plot illustrating confinement loss (CL) characteristics of the hollow-core photonic crystal fiber for different core diameters at 1.6 THz for different types of oil, according to aspects of the present disclosure.
Figure 5B:
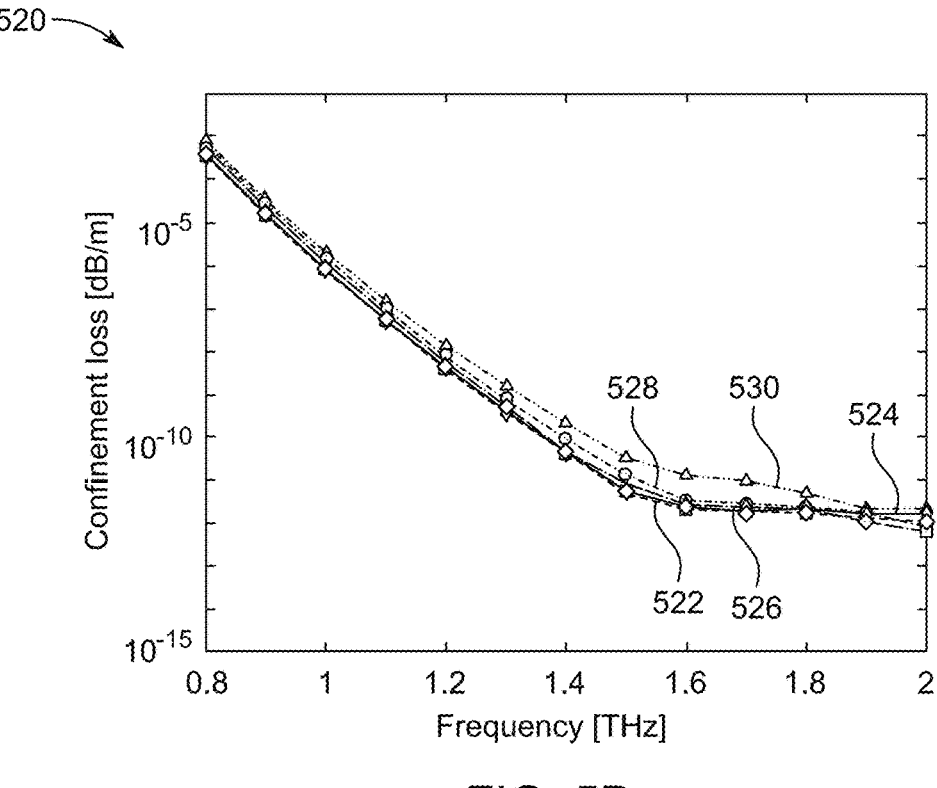
FIG. 5B shows a plot illustrating CL characteristics of the hollow-core photonic crystal fiber for different values of frequencies at 340 μm core diameter for different types of oil, according to aspects of the present disclosure.

FIG. 5A and FIG. 5B depict CL characteristics of the hollow-core photonic crystal fiber 101 for different core diameters at 1.6 THz and different values of frequencies at 340 µm core diameter for sunflower oil, mustard oil, olive oil, palm oil, and coconut oil. In particular, FIG. 5A shows a plot 500 illustrating CL characteristics of the hollow-core photonic crystal fiber 101 for different core diameters at 1.6 THz for sunflower oil, mustard oil, olive oil, palm oil, and coconut oil, according to aspects of the present disclosure. In FIG. 5A, plot line 502 represents CL characteristics of the hollow-core photonic crystal fiber 101 for different core diameters at 1.6 THz for sunflower oil. Plot line 504 represents CL characteristics of the hollow-core photonic crystal fiber 101 for different core diameters at 1.6 THz for mustard oil. Plot line 506 represents CL characteristics of the hollow-core photonic crystal fiber 101 for different core diameters at 1.6 THz for olive oil. Plot line 508 represents CL characteristics of the hollow-core photonic crystal fiber 101 for different core diameters at 1.6 THz for palm oil. Plot line 510 represents CL characteristics of the hollow-core photonic crystal fiber 101 for different core diameters at 1.6 THz for coconut oil.

FIG. 5B shows a plot 520 illustrating CL characteristics of the hollow-core photonic crystal fiber 101 for different values of frequencies at 340 µm core diameter for sunflower oil, mustard oil, olive oil, palm oil, and coconut oil, according to aspects of the present disclosure. In FIG. 5B, plot line 522 represents CL characteristics of the hollow-core photonic crystal fiber 101 for different values of frequencies at 340 µm core diameter for sunflower oil. Plot line 524 represents CL characteristics of the hollow-core photonic crystal fiber 101 for different values of frequencies at 340 µm core diameter for mustard oil. Plot line 526 represents CL characteristics of the hollow-core photonic crystal fiber 101 for different values of frequencies at 340 µm core diameter for olive oil. Plot line 528 represents CL characteristics of the hollow-core photonic crystal fiber 101 for different values of frequencies at 340 µm core diameter for palm oil. Plot line 530 represents CL characteristics of the hollow-core photonic crystal fiber 101 for different values of frequencies at 340 µm core diameter for coconut oil.

As can be observed in FIG. 5A and FIG. 5B, the loss reduces when the x-axis parameter is raised, since increasing the core width and frequency allows more light to enter the hexagonal core wall 103. At optimum core diameter (340 µm) and operating frequency (1.6 THz), the CL of the hollow-core photonic crystal fiber 101 is 1.91×10$^{-12}$ dB/m, 1.93× 10$^{-12}$ dB/m, 2.62×10$^{-12}$ dB/m,3.3×10$^{-12}$ dB/m and 1.31×10$^{-11}$ dB/m for sunflower oil, mustard oil, olive oil, palm oil, and coconut oil, respectively.

Figure 6A:
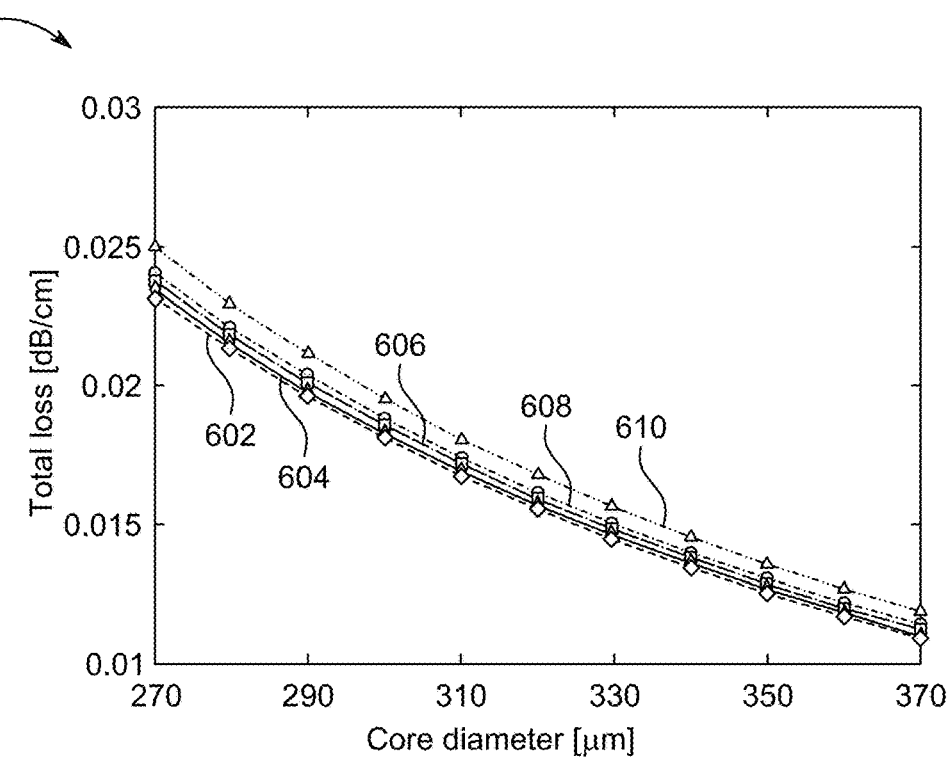
FIG. 6A shows a plot illustrating a total loss of the hollow-core photonic crystal fiber for different core diameters at 1.6 THz for different types of oil, according to aspects of the present disclosure.
Figure 6B:
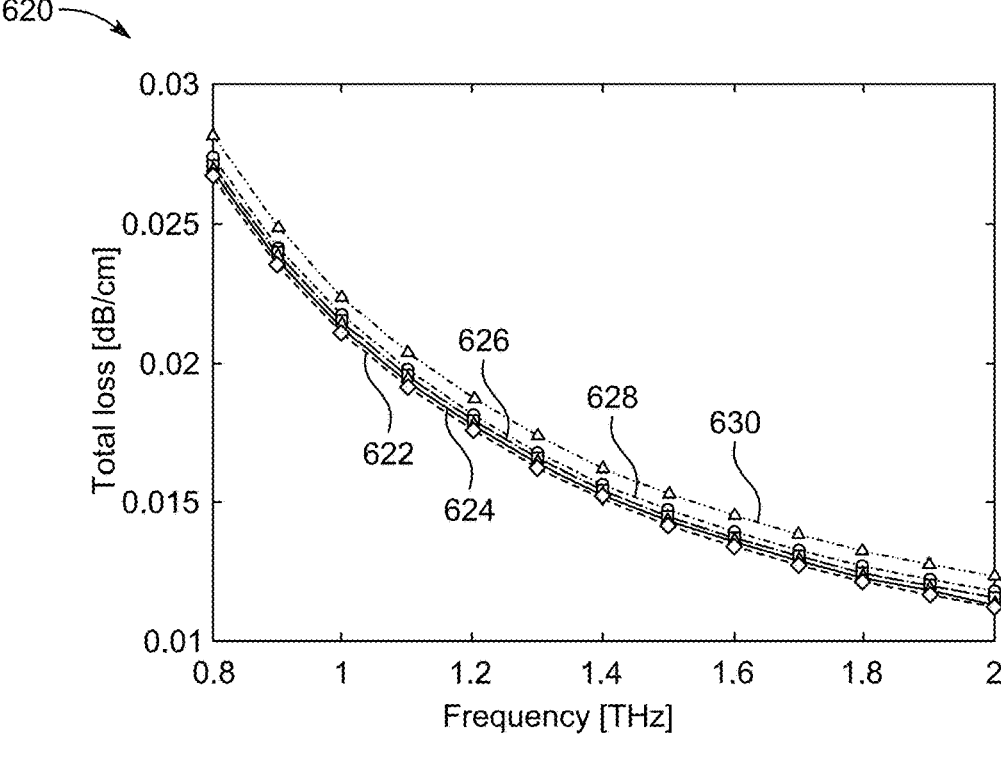
FIG. 6B shows a plot illustrating a total loss of the hollow-core photonic crystal fiber for different values of frequencies at 340 μm core diameter for different types of oil, according to aspects of the present disclosure.

FIG. 6A and FIG. 6B depict total loss of the hollow-core photonic crystal fiber 101 for different core diameters at 1.6 THz and different values of frequencies at 340 µm core diameter for sunflower oil, mustard oil, olive oil, palm oil, and coconut oil. In particular, FIG. 6A shows a plot 600 illustrating a total loss of the hollow-core photonic crystal fiber 101 for different core diameters at 1.6 THz for sunflower oil, mustard oil, olive oil, palm oil, and coconut oil, according to aspects of the present disclosure. In FIG. 6A, plot line 602 represents a total loss of the hollow-core photonic crystal fiber 101 for different core diameters at 1.6 THz for sunflower oil. Plot line 604 represents a total loss of the hollow-core photonic crystal fiber 101 for different core diameters at 1.6 THz for mustard oil. Plot line 606 represents a total loss of the hollow-core photonic crystal fiber 101 for different core diameters at 1.6 THz for olive oil. Plot line 608 represents total loss of the hollow-core photonic crystal fiber 101 for different core diameters at 1.6 THz for palm oil. Plot line 610 represents a total loss of the hollow-core photonic crystal fiber 101 for different core diameters at 1.6 THz for coconut oil.

FIG. 6B shows a plot 620 illustrating a total loss of the hollow-core photonic crystal fiber 101 for different values of frequencies at 340 µm core diameter for sunflower oil, mustard oil, olive oil, palm oil, and coconut oil, according to aspects of the present disclosure. In FIG. 6B, plot line 622 represents a total loss of the hollow-core photonic crystal fiber 101 for different values of frequencies at 340 µm core diameter for sunflower oil. Plot line 624 represents a total loss of the hollow-core photonic crystal fiber 101 for different values of frequencies at 340 µm core diameter for mustard oil. Plot line 626 represents a total loss of the hollow-core photonic crystal fiber 101 for different values of frequencies at 340 µm core diameter for olive oil. Plot line 628 represents a total loss of the hollow-core photonic crystal fiber 101 for different values of frequencies at 340 µm core diameter for palm oil. Plot line 630 represents a total loss of the hollow-core photonic crystal fiber 101 for different values of frequencies at 340 µm core diameter for coconut oil.

FIG. 6A and FIG. 6B depict overall loss incurred by the hollow-core photonic crystal fiber 101. At optimum conditions, the total losses incurred by the hollow-core photonic crystal fiber 101 for sunflower oil, mustard oil, olive oil, palm oil, and coconut oil are 0.0131 dB/cm, 0.0134 dB/cm, 0.0139 dB/cm, 0.0141 dB/cm, and 0.0145 dB/cm, respectively.

Figure 7:
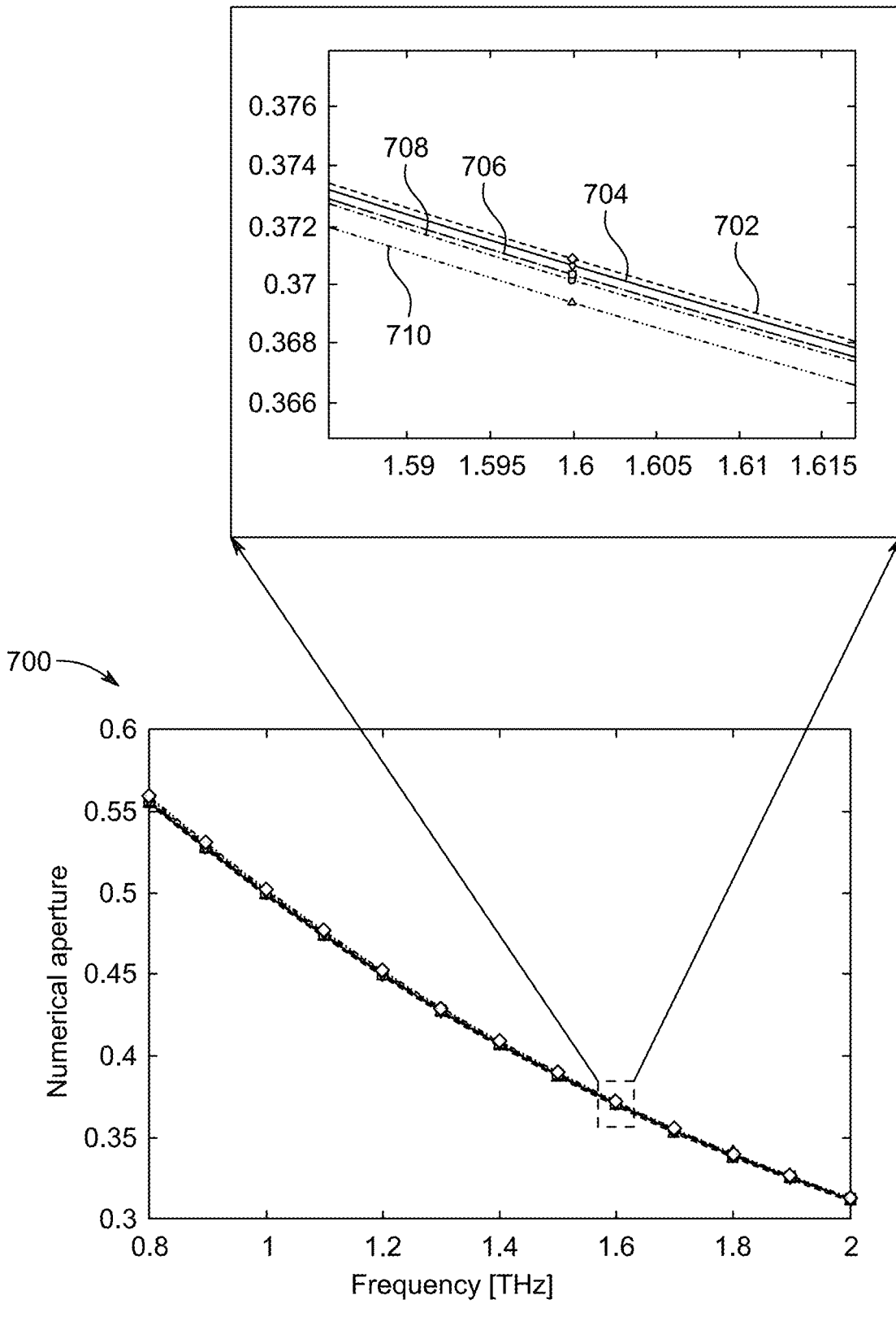
FIG. 7 shows a plot illustrating a numerical aperture of the hollow-core photonic crystal fiber for different operating frequencies for different types of oil, according to aspects of the present disclosure.

FIG. 7 shows a plot 700 illustrating a numerical aperture of the hollow-core photonic crystal fiber 101 for different operating frequencies for different types of oil, according to aspects of the present disclosure. In FIG. 7, plot line 702 represents a numerical aperture of the hollow-core photonic crystal fiber 101 for different operating frequencies for sunflower oil. Plot line 704 represents a numerical aperture of the hollow-core photonic crystal fiber 101 for different operating frequencies for mustard oil. Plot line 706 represents a numerical aperture of the hollow-core photonic crystal fiber 101 for different operating frequencies for olive oil. Plot line 708 represents a numerical aperture of the hollow-core photonic crystal fiber 101 for different operating frequencies for palm oil. Plot line 710 represents a numerical aperture of the hollow-core photonic crystal fiber 101 for different operating frequencies for coconut oil.

A numerical aperture of the hollow-core photonic crystal fiber 101 determines the greatest permissible cone of incident light that would pass through the optical waveguide. The greater the numerical aperture, the higher the probability of the light reaching the hexagonal core wall 103 and increasing the likelihood of light-analyte interaction within the hollow-core photonic crystal fiber 101. The mathematical expression to calculate the numerical aperture of the hollow-core photonic crystal fiber 101 is given by Equation (6) provided below. For ease of representation, the numerical aperture is abbreviated to NA in Equation (6).

$$NA = \frac{1}{\sqrt{1 + \frac{\pi A_{eff} f^2}{c^2}}} \approx \frac{1}{\sqrt{1 + \frac{\pi A_{eff}}{\lambda^2}}} \quad (6)$$

where $A_{eff}$ represents the effective area of the hollow-core photonic crystal fiber 101, which represents the actual area through which the light propagates, and f represents the frequency of the incident light beam.

At higher operating frequency f, light confinement becomes more condensed, resulting in a reduced effective area. According to Equation (6), the numerical aperture and the effective area of the hollow-core photonic crystal fiber 101 are inversely proportional, indicating that the numerical aperture decreases as the operating frequency increases. FIG. 7 also shows that the numerical aperture of the hollow-core photonic crystal fiber 101 is about 0.37 for various types of oil samples at 1.6 THz.

Figure 8:
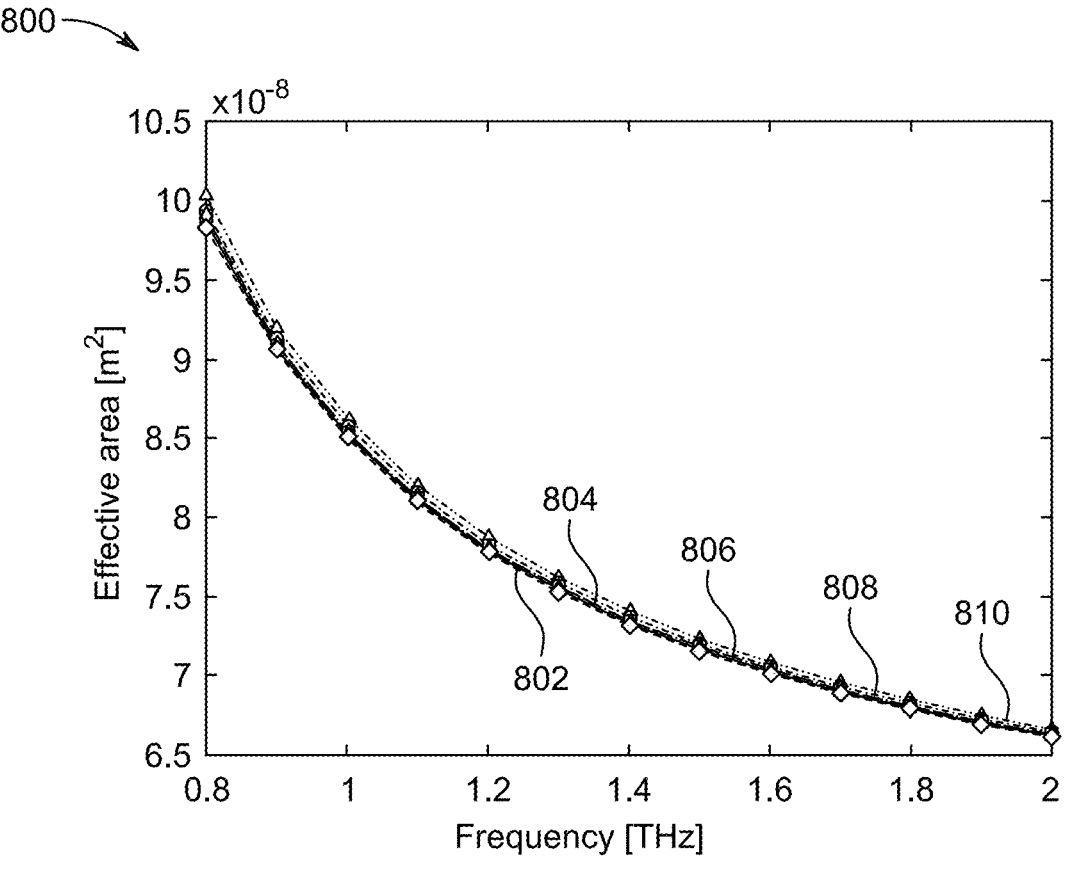
FIG. 8 shows a plot illustrating an effective area of the hollow-core photonic crystal fiber for different operating frequencies at core diameter 340 μm for different types of oil, according to aspects of the present disclosure.

FIG. 8 shows a plot 800 illustrating an effective area of the hollow-core photonic crystal fiber 101 for different operating frequencies at core diameter 340 µm for different types of oil, according to aspects of the present disclosure. In FIG. 8, plot line 802 represents an effective area of the hollow-core photonic crystal fiber 101 for different operating frequencies at core diameter 340 µm for sunflower oil. Plot line 804 represents an effective area of the hollow-core photonic crystal fiber 101 for different operating frequencies at core diameter 340 µm for mustard oil. Plot line 806 represents an effective area of the hollow-core photonic crystal fiber 101 for different operating frequencies at core diameter 340 µm for olive oil. Plot line 808 represents an effective area of the hollow-core photonic crystal fiber 101 for different operating frequencies at core diameter 340 µm for palm oil. Plot line 810 represents an effective area of the hollow-core photonic crystal fiber 101 for different operating frequencies at core diameter 340 µm for coconut oil.

In examples, an effective area of the hollow-core photonic crystal fiber 101 is calculated using Equation (7), provided below.

$$A_{eff} = \frac{\left[\int I(r) r dr\right]^2}{\left[\int I^2(r) dr\right]^2} \quad (7)$$

14 where $I(r) = |E_r|^2$ represents the electric field distribution of the hollow-core photonic crystal fiber 101.

FIG. 8 depicts an effective area of the hollow-core photonic crystal fiber 101 for the optimal core diameter as the frequency is changed from 0.8 THz to 2 THz. FIG. 8 also indicates that the effective area is inversely related to the operating frequency. The high-frequency electromagnetic signal is tightly confined within a small region of the hollow-core photonic crystal fiber 101. At ideal operating conditions, the effective area of the hollow-core photonic crystal fiber 101 is around $7.1 \times 10^{-8}$ m² for all oil samples.

Table 2 provided below shows a comparison of sensing and guiding characteristics of the hollow-core photonic crystal fiber 101 with sensing and guiding characteristics of conventional photonic crystal fiber-based sensors. Table 2 shows that the hollow-core photonic crystal fiber 101 performed better than the conventional photonic crystal fiber-based sensors in terms of relative sensitivity.

TABLE 2

Comparison of sensing and guiding characteristics of the hollow-core photonic crystal fiber 101 with sensing and guiding characteristics of the conventional photonic crystal fiber-based sensors.

| Study | Year | Sensing Sample | Relative Sensitivity (%) | Confinement Loss (dB/m) | Numerical Aperture |
|---|---|---|---|---|---|
| A | 2018 | Benzene | 97.20 | $8.80{*}10^{-12}$ | — |
| | | Ethanol | 96.97 | $5.13{*}10^{-12}$ | — |
| | | Water | 96.69 | $2.41{*}10^{-12}$ | — |
| B | 2019 | RBC | 93.50 | $1.80{*}10^{-12}$ | — |
| | | Hemoglobin | 92.41 | $6.13{*}10^{-12}$ | — |
| | | WBC | 91.25 | $2.15{*}10^{-11}$ | — |
| | | Plasma | 90.48 | $5.85{*}10^{-11}$ | — |
| | | Water | 89.14 | $8.93{*}10^{-11}$ | — |
| C | 2020 | Benzene | 98.50 | $2.34{*}10^{-12}$ | — |
| | | Ethanol | 98.20 | $5.98{*}10^{-12}$ | — |
| | | Water | 97.60 | $9.51{*}10^{-11}$ | — |
| D | 2021 | RBC | 95.80 | $3.80{*}10^{-11}$ | 0.38 |
| | | Hemoglobin | 95.00 | $1.13{*}10^{-11}$ | 0.38 |
| | | WBC | 93.60 | $2.15{*}10^{-10}$ | 0.38 |
| | | Plasma | 92.50 | $6.25{*}10^{-10}$ | 0.38 |
| | | Water | 91.40 | $8.3{*}10^{-11}$ | 0.38 |
| Hollow-core photonic crystal fiber 101 | 2022 | Sunflower oil | 99.65 | $1.91{*}10^{-12}$ | 0.37 |
| | | Mustard oil | 99.60 | $1.93{*}10^{-12}$ | 0.37 |
| | | Olive oil | 99.55 | $2.62{*}10^{-12}$ | 0.37 |
| | | Coconut oil | 99.50 | $3.3{*}10^{-12}$ | 0.37 |
| | | Palm oil | 99.35 | $1.31{*}10^{-11}$ | 0.37 |

Study A: M. S. Islam, J. Sultana, A. A. Rifat, A. Dinovitser, B. W.-H. Ng, D. Abbott, "Terahertz sensing in a hollow core photonic crystal fiber," IEEE Sensors Journal, vol. 18, no. 10, pp. 4073-4080, 2018.
Study B: M. M. A. Eid, M. A. Habib, M. S. Anower, and A. N. Z. Rashed, "Hollow core photonic crystal fiber (PCF) based optical sensor for blood component detection in terahertz spectrum," Brazilian Journal of Physics, https://doi.org/10.1007/s13538-021-00906-7.
Study C: M. S. Reza, and M. A. Habib, "Extremely sensitive chemical sensor for terahertz regime based on hollow-core photonic crystal fiber" Ukranian Journal of Physical Optics, vol. 21, no. 1, pp. 8-14, 2020.
Study D: K. Wang, and D. Mittleman, "Metal wires for terahertz wave guiding" Nature, vol. 432, pp. 376-379, 2004.

The cross-sectional depiction of the hollow-core photonic crystal fiber 101 shown in FIG. 1B shows that the hollow-core photonic crystal fiber 101 is hybrid in structure and has a hexagonal-shaped core. Furthermore, the manufacturing complexity of the hollow-core photonic crystal fiber 101 is reduced since the hexagonal core wall 103 and the wedge-shaped air gaps 122*a-d* are reliant only on one constant core diameter. The hollow-core photonic crystal fiber 101 can be produced in laboratories with low complexity. Additionally, preferred fiber dimensions of the hollow-core photonic crystal fiber 101 are about 1.4 mm, whereas that of conventional fibers is less than 1 mm, which indicates that the hollow-core photonic crystal fiber 101 can be fabricated easily in laboratories. The innovative hybrid structural cladding provides a compact waveguide, allowing the hollow-core photonic crystal fiber 101 to have effective sensing capabilities. The hollow-core photonic crystal fiber 101 achieves an extremely high relative sensitivity of 99%, minimal confinement loss of about 10-13 dB/m, a low effective material loss of 0.0035 cm$^{-1}$, and a high numerical aperture of 0.37.

FIG. 9 shows a flowchart 900 of a method for sensing an edible oil using the hollow-core photonic crystal fiber 101, according to some embodiments.

In an overview of the implementation of the flowchart 900, at step 902, an oil sample is placed in the hollow space 108 of the hollow-core photonic crystal fiber 101. At step 904, an optical light beam is propagated from a light source through the hexagonal core wall 103 of the hollow-core photonic crystal fiber 101, where the light source is coupled to an input end of the hollow-core photonic crystal fiber 101. In examples, the optical light beam from the light source has a wavelength in a range from 0.1 up to 10 terahertz. At step 906, an output light beam is received from the hollow-core photonic crystal fiber 101 at an optical detector, where the optical detector is coupled to an output end the hollow-core photonic crystal fiber 101. In examples, the hollow-core photonic crystal fiber 101 is a hollow-core photonic crystal fiber sensor, and the optical detector is coupled to the photonic crystal fiber sensor.

At step 908, a power, and an effective refractive index of the received output light beam are recorded using a spectrum analyzer. At step 910, the power and the effective refractive index are processed to identify a type of the oil sample. In an aspect, the flowchart 900 of the method includes absorbing light that seeps from the hexagonal core wall 103 to an outer surface of the cladding region 104 using the circular layer 106 of the hollow-core photonic crystal fiber 101.

Numerous modifications and variations of the present disclosure are possible in light of the above teachings. It is therefore to be understood that within the scope of the appended claims, the invention may be practiced otherwise than as specifically described herein.

The invention claimed is:

1. A hollow-core photonic crystal fiber for sensing an oil, comprising
   a hexagonal core wall defining a hollow space wherein a core diameter is equal to a distance between two opposing inner vertices of the hexagonal core wall;
   a cladding region comprising a circular cladding segment and up to four cladding arms, wherein the up to four cladding arms extend from the circular cladding segment to four outer vertices of the hexagonal core wall;
   wherein an inner wall of the circular cladding segment, the up to four cladding arms and an outer surface of the hexagonal core wall define four wedge shaped air gaps;
   wherein the cladding region has an inner radius with a range from 2.0 up to 2.4 times the core diameter and an outer radius with a range from 2.1 up to 2.6 times the core diameter; and
   a circular layer circumferentially surrounding the cladding region.

2. The hollow-core photonic crystal fiber of claim 1, wherein a width of the hexagonal core wall has a range from 0.12 up to 0.15 times the core diameter.

3. The hollow-core photonic crystal fiber of claim 1, wherein two air gaps of the up to four wedge shaped air gaps are pentagonal wedge-shaped air gaps having one arced surface.

4. The hollow-core photonic crystal fiber of claim 1, wherein two air gaps of the up to four wedge shaped air gaps are quadrilateral wedge-shaped air gaps having one arced surface.

5. The hollow-core photonic crystal fiber of claim 1, wherein the hollow space of the hexagonal core wall is filled with an oil sample.

6. The hollow-core photonic crystal fiber of claim 1, wherein the hollow-core photonic crystal fiber is configured to utilize a light source with a wavelength in a range from 0.1 up to 10 terahertz.

7. The hollow-core photonic crystal fiber of claim 1, wherein the hexagonal core wall is configured to carry an optical light for sensing oil.

8. The hollow-core photonic crystal fiber of claim 1, wherein the circular layer is configured to absorb light at the outer surface of the cladding region.

9. The hollow-core photonic crystal fiber of claim 1, wherein a material utilized for the cladding region is a cycle olefin polymer.

10. The hollow-core photonic crystal fiber of claim 1, wherein a material utilized for the circular layer is at least one of an anisotropic material and a dispersive material.

11. The hollow-core photonic crystal fiber of claim 1, wherein the circular layer is directly adjacent to the circular cladding segment of the cladding region.

12. The hollow-core photonic crystal fiber of claim 1, configured as a fiber sensor.

13. The hollow-core photonic crystal fiber of claim 12, configured to analyze a refractive index of an oil sample.

14. A method of sensing an oil using the hollow-core photonic crystal fiber of claim 1 configured as a fiber sensor comprising:
   placing an oil sample in the hollow space of the hollow-core photonic crystal fiber;
   propagating a light beam from a light source through the hexagonal core wall of the hollow-core photonic crystal fiber, wherein the light source is coupled to an input end of the hollow-core photonic crystal fiber;
   receiving an output light beam from the hollow-core photonic crystal fiber at an optical detector, wherein the optical detector is coupled to an output end the hollow-core photonic crystal fiber;
   recording a power and an effective refractive index of the received output light beam using a spectrum analyzer; and
   processing the power and the effective refractive index to identify a type of the oil sample.

15. The method of sensing oil of claim 14, further comprising
   absorbing light that seeps from the hexagonal core wall to an outer surface of the cladding region using the circular layer of the hollow-core photonic crystal fiber.

16. The method of sensing oil of claim 14, wherein the optical light beam from the light source has a wavelength in a range from 0.1 up to 10 terahertz.

\* \* \* \* \*